(12) United States Patent
Tsujimoto et al.

(10) Patent No.: US 8,297,044 B2
(45) Date of Patent: Oct. 30, 2012

(54) EXHAUST PURIFICATION DEVICE OF AN INTERNAL COMBUSTION ENGINE

(75) Inventors: Kenichi Tsujimoto, Susono (JP);
Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 403 days.

(21) Appl. No.: 12/449,972

(22) PCT Filed: Mar. 19, 2008

(86) PCT No.: PCT/JP2008/055796
§ 371 (c)(1),
(2), (4) Date: Sep. 4, 2009

(87) PCT Pub. No.: WO2008/114887
PCT Pub. Date: Sep. 25, 2008

(65) Prior Publication Data
US 2010/0115923 A1 May 13, 2010

(30) Foreign Application Priority Data

Mar. 20, 2007 (JP) ................................ 2007-072156

(51) Int. Cl.
*F01N 3/00* (2006.01)
(52) U.S. Cl. .......................................... 60/295; 60/301
(58) Field of Classification Search ................ 60/285, 60/286, 295, 301
See application file for complete search history.

(56) References Cited

U.S. PATENT DOCUMENTS

| | | | | |
|---|---|---|---|---|
| 5,388,406 A | * | 2/1995 | Takeshima et al. | 60/297 |
| 5,551,231 A | | 9/1996 | Tanaka et al. | |
| 2003/0126859 A1 | * | 7/2003 | Wachi et al. | 60/285 |
| 2004/0154288 A1 | | 8/2004 | Okada et al. | |
| 2005/0028518 A1 | * | 2/2005 | Li et al. | 60/300 |
| 2005/0060987 A1 | * | 3/2005 | Nakano et al. | 60/285 |
| 2007/0051096 A1 | | 3/2007 | Pfeifer et al. | |
| 2011/0258993 A1 | | 10/2011 | Goersmann et al. | |

FOREIGN PATENT DOCUMENTS

| | | |
|---|---|---|
| CN | 1784540 A | 6/2006 |
| DE | 199 18 756 A1 | 10/2000 |
| EP | 1 152 140 A2 | 11/2001 |
| EP | 1 243 766 A2 | 9/2002 |
| EP | 1256704 A2 * | 11/2002 |

(Continued)

OTHER PUBLICATIONS

Aug. 2, 2011 Search Report issued in European Patent Application No. 08 73 8963.1.

*Primary Examiner* — Thomas Denion
*Assistant Examiner* — Patrick Maines
(74) *Attorney, Agent, or Firm* — Oliff & Berridge, PLC (57) ABSTRACT

In an internal combustion engine, a pair of $NO_x$ storing catalysts are arranged in series in an engine exhaust passage. When causing the upstream $NO_x$ storing catalyst to release $NO_x$ and store the released $NO_x$ in the downstream $NO_x$ storing catalyst, the oxygen concentration in the exhaust gas is temporarily reduced in a state where the exhaust gas is maintained at a lean air-fuel ratio. As opposed to this, when releasing $NO_x$ from the upstream $NO_x$ storing catalyst and the downstream $NO_x$ storing catalyst and reducing the $NO_x$, the air-fuel ratio of the exhaust gas is temporarily switched from lean to rich.

3 Claims, 5 Drawing Sheets

FOREIGN PATENT DOCUMENTS

| | | |
|---|---|---|
| JP | A-7-145725 | 6/1995 |
| JP | A-7-310535 | 11/1995 |
| JP | A-2000-257417 | 9/2000 |
| JP | A-2002-188429 | 7/2002 |
| JP | A-2003-49681 | 2/2003 |
| JP | A-2003-201888 | 7/2003 |
| JP | A-2004-108176 | 4/2004 |
| JP | A-2005-291098 | 10/2005 |
| JP | A-2006-519331 | 8/2006 |
| WO | WO 00/43647 A1 | 7/2000 |

\* cited by examiner

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storing catalyst which stores $NO_x$ contained in exhaust gas when the air-fuel ratio of the inflowing exhaust gas is lean and releases stored $NO_x$ when the air-fuel ratio of the inflowing exhaust gas becomes a stoichiometric air-fuel ratio or rich (see for example Japanese Patent Publication (A) No. 2004-108176). In this internal combustion engine, if the $NO_x$ storage ability of the $NO_x$ storing catalyst approaches saturation, the air-fuel ratio of the exhaust gas is temporarily made rich whereby $NO_x$ is released from the $NO_x$ storing catalyst and reduced.

In this way, in the past, when releasing $NO_x$ from an $NO_x$ storing catalyst, the air-fuel ratio of the $NO_x$ exhaust gas is made the stoichiometric air-fuel ratio or rich to release the $NO_x$ which is then reduced in the $NO_x$ storing catalyst. However, depending on the case, there are also cases when it is preferable for the $NO_x$ released from the $NO_x$ storing catalyst to be exhausted from the $NO_x$ storing catalyst without being reduced.

DISCLOSURE OF THE INVENTION

An object of the present invention is to provide an exhaust purification device of an internal combustion engine reducing or not reducing $NO_x$ released from an $NO_x$ storing catalyst according to need.

According to the present invention, there is provided an exhaust purification device of an internal combustion engine arranging in series in an engine exhaust passage at least a pair of $NO_x$ storing catalysts which store $NO_x$ contained in an exhaust gas when an air-fuel ratio of an inflowing exhaust gas is lean and release stored $NO_x$ when an oxygen concentration of the inflowing exhaust gas drops, the oxygen concentration of the exhaust gas being temporarily reduced while the exhaust gas is maintained at a lean air-fuel ratio when releasing $NO_x$ from an upstream $NO_x$ storing catalyst and storing the released $NO_x$ in a downstream $NO_x$ storing catalyst, the air-fuel ratio of the exhaust gas being temporarily switched from lean to rich when releasing $NO_x$ from the upstream $NO_x$ storing catalyst and the downstream $NO_x$ storing catalyst and reducing $NO_x$.

In the present invention, by moving the $NO_x$ stored in the upstream $NO_x$ storing catalyst, which has a comparatively high catalyst temperature and a high $NO_x$ storage ability, to the downstream $NO_x$ storing catalyst according to need, the $NO_x$ storage ability of the upstream $NO_x$ storing catalyst can be restored.

BEST MODE FOR CARRYING OUT THE INVENTION

Figure 1:
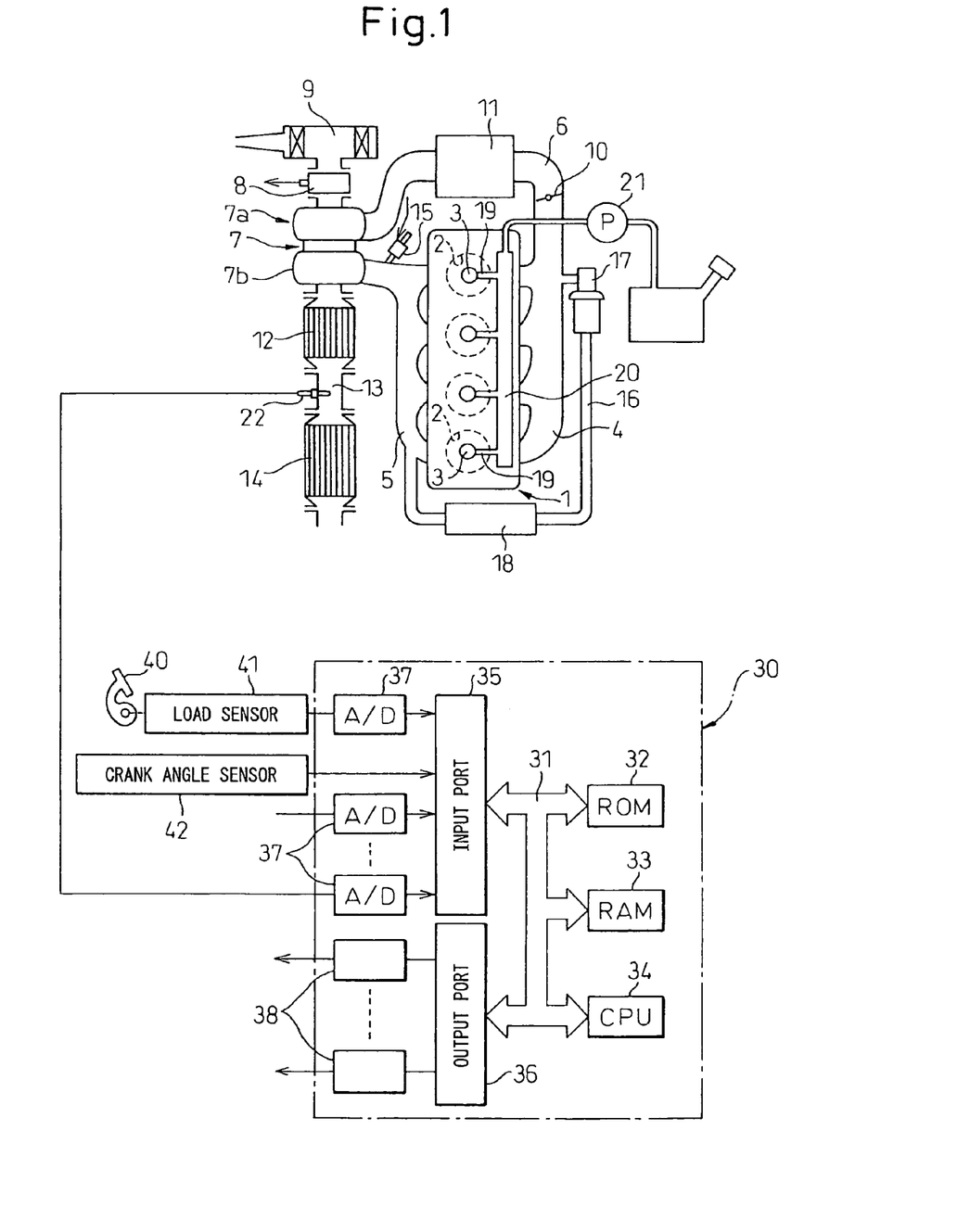
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake air amount detector 8. Inside the intake duct 6 is arranged a throttle valve 10 driven by a step motor. Further, around the intake duct 6 is arranged a cooling device 11 for cooling the intake air flowing through the inside of the intake duct 6. In the embodiment shown in FIG. 1, the engine cooling water is guided into the cooling device 11. The engine cooling water cools the intake air.

On the other hand, the exhaust manifold 5 is connected to the inlet of an exhaust turbine 7b of the exhaust turbocharger 7. The outlet of the exhaust turbine 7b is connected to the inlet of an upstream $NO_x$ storing catalyst 12, and the outlet of the upstream $NO_x$ storing catalyst 12 is connected to the inlet of a downstream $NO_x$ storing catalyst 14 via an exhaust pipe 13. Note that another $NO_x$ storing catalyst may be further arranged downstream of the downstream $NO_x$ storing catalyst 14. On the other hand, a reducing agent feed valve 15 for feeding a reducing agent comprised of a hydrocarbon into the exhaust gas flowing within the exhaust manifold 5 is attached to the exhaust manifold 5.

The exhaust manifold 5 and the intake manifold 4 are interconnected through an exhaust gas recirculation (hereinafter referred to as an "EGR") passage 16, and an electronically controlled EGR control valve 17 is arranged in the EGR passage 16. Further, around the EGR passage 16 is arranged a cooling device 18 for cooling the EGR gas flowing through the inside of the EGR passage 16. In the embodiment shown in FIG. 1, the engine cooling water is guided into the cooling device 18. The engine cooling water cools the EGR gas. On the other hand, each fuel injector 3 is connected through a fuel feed tube 19 to a common rail 20. This common rail 20 is supplied with fuel from an electronically controlled variable discharge fuel pump 21. The fuel supplied into the common rail 20 is supplied through each fuel feed tube 19 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. A temperature sensor 22 for detecting the temperature of the exhaust gas flowing within the exhaust pipe 13 is arranged in the exhaust pipe 13. When the temperature of the exhaust gas flowing within the exhaust pipe 13 changes, the temperatures of the upstream $NO_x$ storing catalyst 12 and the downstream $NO_x$ storing catalyst 14 accordingly change and, thus, the temperature of the exhaust gas flowing within the exhaust pipe 13 represents the temperatures of a pair of the $NO_x$ storing catalysts 12, 14 arranged in series. As shown in FIG. 1, the output signals of the temperature sensor 22 and the intake air amount detector 8 are input through corresponding AD converters 37 to the input port 35.

An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, the step motor for driving the throttle valve 10, reducing agent feed valve 15, EGR control valve 17, and fuel pump 21.

Figure 2:
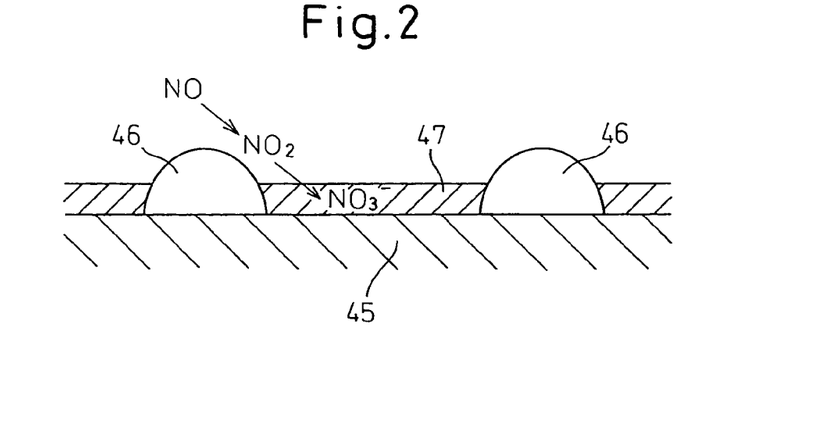
FIG. 2 is a cross-sectional view of a surface portion of a catalyst carrier of an $NO_x$ storing catalyst.

First, explaining the $NO_x$ storing catalysts 12, 14 shown in FIG. 1, a catalyst carrier comprised of for example alumina is carried on the $NO_x$ storing catalysts 12, 14, and FIG. 2 schematically show the cross-section of the surface part of this catalyst carrier 45. As shown in FIG. 2, the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth is used.

If the ratio of the air and fuel (hydrocarbons) supplied to the engine intake passage, combustion chambers 2, and exhaust passage upstream of the $NO_x$ storing catalyst 12 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 2 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

Figure 3:
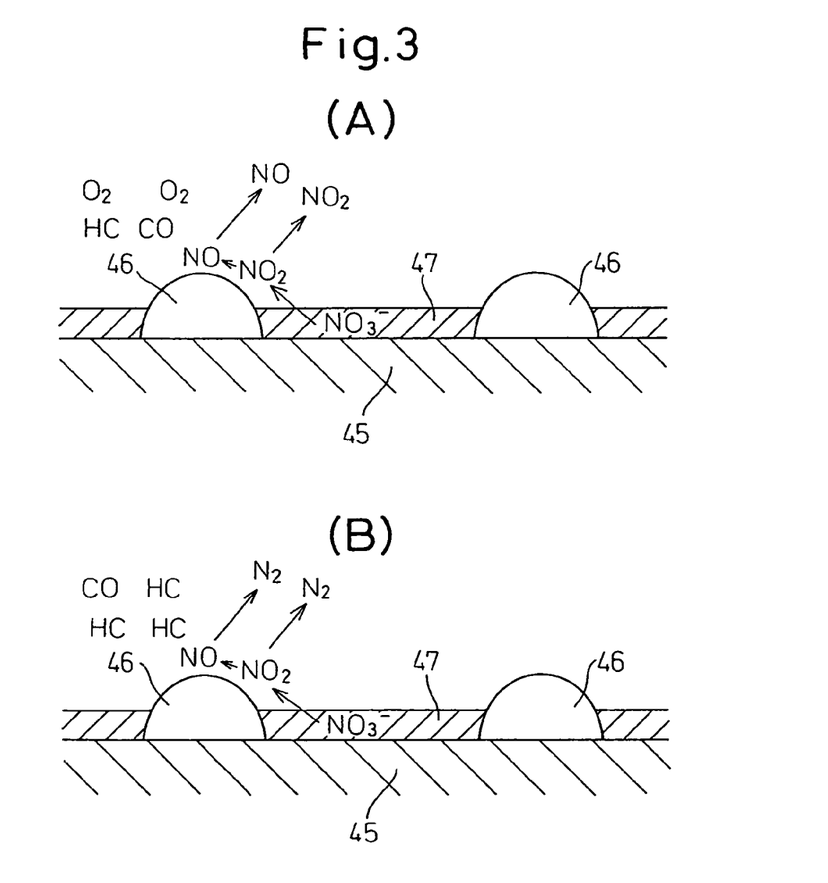
FIGS. 3(a) and 3(b) are cross-sectional views of surface portions of an $NO_x$ storing catalyst.

As opposed to this, if a reducing agent is fed from the reducing agent feed valve 15, the air-fuel ratio of the exhaust gas becomes small. At this time, since oxygen contained in the exhaust gas is consumed to oxidize the reducing agent, the oxygen concentration in the exhaust gas drops. If the oxygen concentration in the exhaust gas drops, the reaction proceeds in the reverse direction ($NO_3^- \rightarrow NO_2$ or NO) as shown in FIGS. 3(A), (B) and therefore the nitric acid ions $NO_3^-$ in the $NO_x$ absorbent 47 are released from the $NO_x$ absorbent 47 in the form of $NO_2$ or NO. Namely, if the oxygen concentration in the inflow exhaust gas drops, $NO_x$ is released from the $NO_x$ absorbent 47.

However, when lowering the air-fuel ratio of the exhaust gas while maintaining a lean air-fuel ratio of the exhaust gas and reducing the oxygen concentration of the exhaust gas, the exhaust gas contains a large amount of oxygen $O_2$ in addition to a reducing agent HC as shown in FIG. 3(A). If a large amount of oxygen $O_2$ is contained in the exhaust gas in this way, the $NO_2$ or the NO released from the $NO_x$ absorbent 47 will not be reduced any further.

On the other hand, if the exhaust gas is made a rich air-fuel ratio, almost all of the oxygen in the exhaust gas ends up being consumed, therefore, as shown in FIG. 3(B), almost none of the oxygen $O_2$ remains in the exhaust gas and therefore the reducing agent HC or CO is present in the exhaust gas. If there is a reducing agent HC or CO present in a state where there is no oxygen $O_2$ remaining, the $NO_2$ or NO released from the $NO_x$ absorbent 47 will be reduced down to $N_2$. Accordingly, at this time, $NO_x$ is not exhausted from the $NO_x$ storing catalyst.

When the air-fuel ratio of the exhaust gas is lean as mentioned above, that is, when combustion is performed under a lean air-fuel ratio, the $NO_x$ in the exhaust gas is absorbed in the $NO_x$ absorbent 47. In this case, since the upstream $NO_x$ storing catalyst 12 has a higher temperature in comparison to the downstream $NO_x$ storing catalyst 14, the upstream $NO_x$ storing catalyst 12 has a higher $NO_x$ storage ability, accordingly, $NO_x$ is absorbed more easily in the $NO_x$ absorbent 47 of the upstream $NO_x$ storing catalyst 12. However, if combustion is continuously performed under a lean air-fuel ratio, the $NO_x$ absorption ability of the $NO_x$ absorbent 47 eventually ends up becoming saturated, and, therefore, the $NO_x$ absorbent 47 becomes unable to absorb $NO_x$ any longer Therefore, in the embodiment according to the present invention, before the $NO_x$ absorbent 47 becomes saturated in absorption ability, a reducing agent is fed from the reducing agent feed valve 15 so as to temporarily make the air-fuel ratio of the exhaust gas rich and thereby make the $NO_x$ absorbent 47 release $NO_x$.

In this regard, when the temperature of the $NO_x$ storing catalyst is low and the catalyst 46 is not activated sufficiently, if a large amount of reducing agent HC is fed from the reducing agent feed valve 15 to make the air-fuel ratio of the exhaust gas rich, a problem occurs in that a considerable amount of reducing agent HC is exhausted into the atmosphere because the reducing agent HC is not reduced sufficiently. Therefore, in the present invention, when the temperatures of the $NO_x$ storing catalysts 12 and 14 are low and the catalyst 46 is not activated sufficiently, only an amount of reducing agent that is able to be oxidized is fed. At this time, the oxygen concentration in the exhaust gas drops while the exhaust gas is maintained at a lean air-fuel ratio, therefore, as seen from FIG. 3(A), $NO_2$ or NO is exhausted from the upstream $NO_x$ storing catalyst 12 and this $NO_2$ or NO is stored in the downstream $NO_x$ storing catalyst 14.

Next, this will be explained while referring to FIG. 4. Note that, in FIG. 4, TC is the temperature detected by the temperature sensor 22, that is, indicates a temperature representing the temperature of the pair of $NO_x$ storing catalysts 12 and 14. Further, ΣNOX1 indicates the stored $NO_x$ amount stored in the upstream $NO_x$ storing catalyst 12, ΣNOX2 indicates the stored $NO_x$ amount stored in the downstream $NO_x$ storing catalyst 14, and A/F indicates the air-fuel ratio of the inflowing gas of the upstream $NO_x$ storing catalyst 12 which changes according to the feed of reducing agent HC from the reducing agent feed valve 15.

Figure 5:
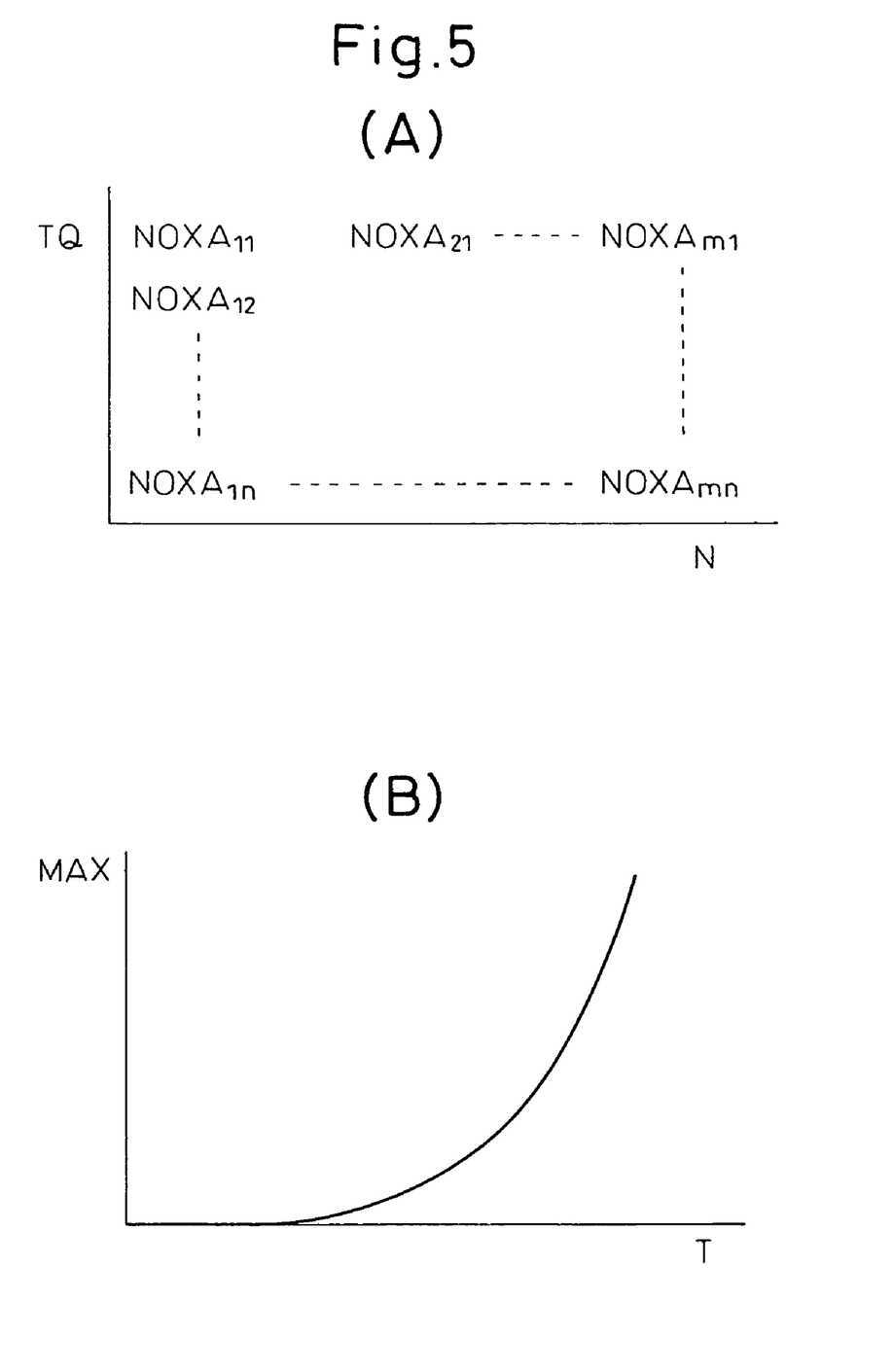
FIGS. 5(a) and 5(b) are views showing a map etc. of the stored $NO_x$ amount NOXA, and showing a map etc. of the relationship of the maximum $NO_x$ storage amount MAX and bed temperature T, respectively.

In the embodiment according to the present invention, the stored $NO_x$ amounts ΣNOX1 and ΣNOX2 are calculated according to the $NO_x$ amount NOXA exhausted per unit time from the combustion chamber 2, the $NO_x$ storage speed of the upstream $NO_x$ storing catalyst 12, etc. Here, the $NO_x$ amount NOXA exhausted per unit time from the combustion chamber 2 is stored as a function of the required torque TQ and engine speed N in the form of a map as shown in FIG. 5(A) in advance in the ROM 32. If this exhausted $NO_x$ amount NOXA is smaller than the $NO_x$ storage speed of the upstream $NO_x$ storing catalyst 12, that is, the maximum $NO_x$ storage amount MAX that the upstream $NO_x$ storing catalyst 12 is able to store per unit time, the exhausted $NO_x$ amount NOXA becomes the $NO_x$ amount NOX1 stored per unit time in the upstream $NO_x$ storing catalyst 12. By cumulatively adding these $NO_x$ amounts NOX1, the stored $NO_x$ amount $\Sigma NOX1$ is obtained.

As opposed to this, if the exhausted $NO_x$ amount NOXA is larger than the $NO_x$ storage speed of the upstream $NO_x$ storing catalyst 12, that is, the maximum $NO_x$ storage amount MAX that the upstream $NO_x$ storing catalyst 12 is able to store per unit time, this maximum $NO_x$ storage amount MAX becomes the $NO_x$ amount NOX1 stored per unit time in the upstream $NO_x$ storing catalyst 12. At this time, the surplus $NO_x$ amount (NOXA−MAX) that was not stored in the upstream $NO_x$ storing catalyst 12 becomes the $NO_x$ amount NOX2 stored per unit time in the downstream $NO_x$ storing catalyst 14. By cumulatively adding these $NO_x$ amounts NOX2, the stored $NO_x$ amount $\Sigma NOX2$ is obtained.

Note that, the maximum $NO_x$ storage amount MAX that the upstream $NO_x$ storing catalyst 12 can store per unit time is a function of the bed temperature of the upstream $NO_x$ storing catalyst 12, the storage $NO_x$ amount $\Sigma NOX1$, and the exhaust gas amount, that is, the intake air amount, etc. The maximum $NO_x$ storage amount MAX is stored as a function of these in advance in the ROM 32. Note that, FIG. 5(B) shows, as an example, the relationship of the maximum $NO_x$ storage amount MAX and the bed temperature T of the upstream $NO_x$ storing catalyst 12.

Figure 4:
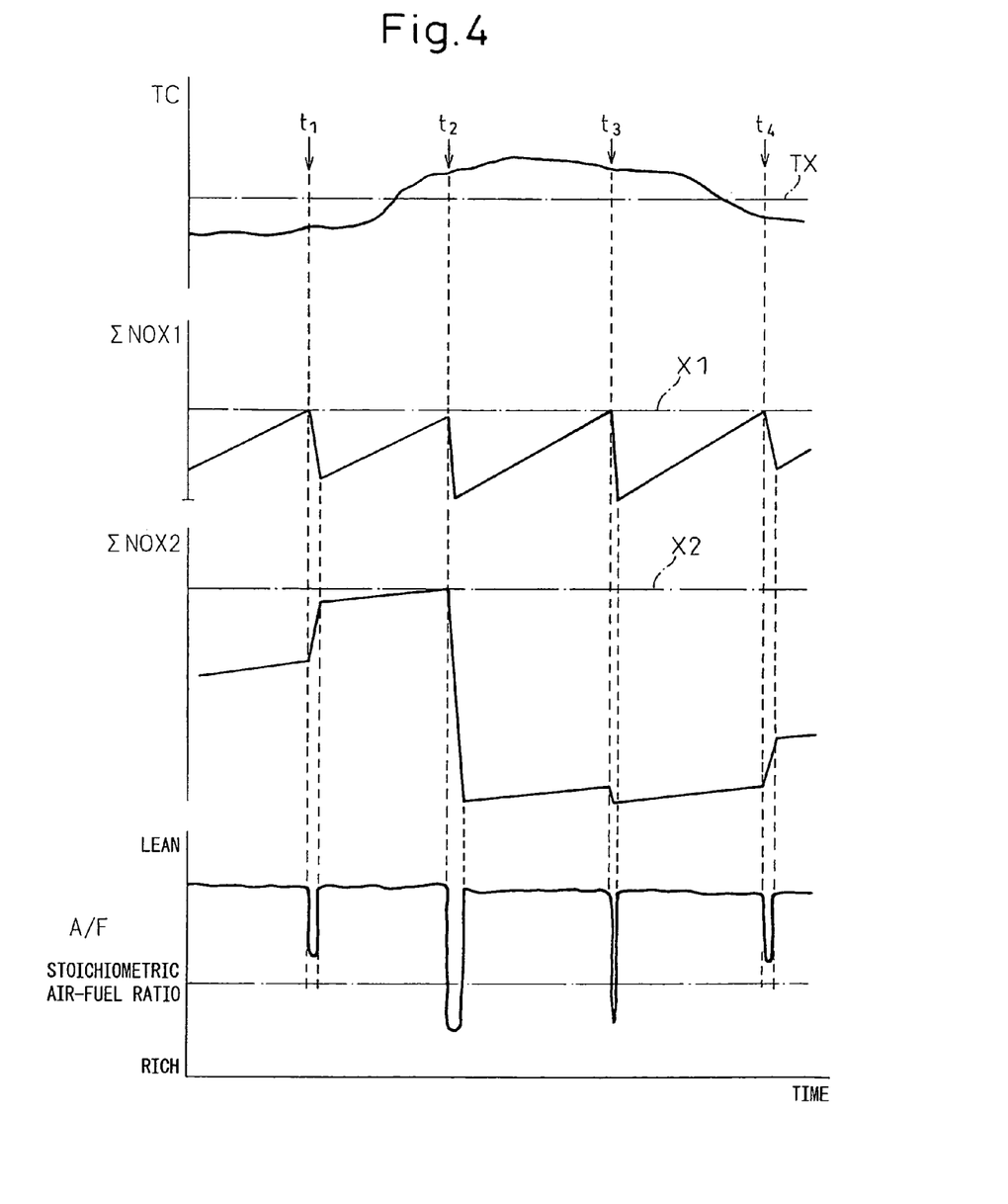
FIG. 4 is a time chart showing $NO_x$ release processing.

As shown in FIG. 4, the air-fuel ratio A/F continues to be in a lean state until the time $t_1$. In this period, the $NO_x$ storage amounts $\Sigma NOX1$ and $\Sigma NOX2$ gradually increase. Next, at the time $t_1$, the $NO_x$ storage amount $\Sigma NOX1$ of the upstream $NO_x$ storing catalyst 12 reaches the allowable value X1. At this time, if the representative temperature TC representative of the $NO_x$ storing catalysts 12 and 14 is lower than a predetermined set temperature TX, as shown in FIG. 4, the air-fuel ratio A/F of the exhaust gas is lowered under a lean air-fuel ratio. At this time, $NO_x$ is released from the upstream $NO_x$ storing catalyst 12 and this released $NO_x$ is stored in the downstream $NO_x$ storing catalyst 14. Accordingly, at this time, the $NO_x$ storage amount $\Sigma NOX1$ of the upstream $NO_x$ storing catalyst 12 drops, and the NOX storage amount $\Sigma NOX2$ of the downstream $NO_x$ storing catalyst 14 increases.

Next, assume that, at the time $t_2$, the $NO_x$ storage amount $\Sigma NOX2$ of the downstream $NO_x$ storing catalyst 14 reaches the allowable value X2. At this time, if assuming the representative temperature TC of the $NO_x$ storing catalysts 12 and 14 is higher than the predetermined set temperature TX, as shown in FIG. 4, the air-fuel ratio A/F of the exhaust gas is switched from lean to rich. At this time, $NO_x$ is released from the upstream $NO_x$ storing catalyst 12 and the downstream $NO_x$ storing catalyst 14, and the released $NO_x$ is reduced. Accordingly, at this time, the $NO_x$ storage amount $\Sigma NOX1$ of the upstream $NO_x$ storing catalyst 12 and the $NO_x$ storage amount $\Sigma NOX2$ of the downstream $NO_x$ storing catalyst 14 are both reduced.

Next, assume that, at the time $t_3$, the $NO_x$ storage amount $\Sigma NOX1$ of the upstream $NO_x$ storing catalyst 12 reaches the allowable value X1. At this time, if the representative temperature TC of the $NO_x$ storing catalysts 12 and 14 is higher than the predetermined set temperature TX, the air-fuel ratio A/F of the exhaust gas is switched from lean to rich as shown in FIG. 4. At this time, $NO_x$ is released from the upstream $NO_x$ storing catalyst 12 and the downstream $NO_x$ storing catalyst 14, and the released $NO_x$ is reduced. Accordingly, at this time, the $NO_x$ storage amount $\Sigma NOX1$ of the upstream $NO_x$ storing catalyst 12 and the $NO_x$ storage amount $\Sigma NOX2$ of the downstream $NO_x$ storing catalyst 14 are both reduced.

Next, assume that, at the time t4, the $NO_x$ storage amount $\Sigma NOX1$ of the upstream $NO_x$ storing catalyst 12 once again reaches the allowable value X1. At this time, if the representative temperature TC of the $NO_x$ storing catalysts 12 and 14 is lower than the predetermined set temperature TX, as shown in FIG. 4, the air-fuel ratio A/F of the exhaust gas is lowered under a lean air-fuel ratio. At this time, $NO_x$ is released from the upstream $NO_x$ storing catalyst 12, and this released $NO_x$ is stored in the downstream $NO_x$ storing catalyst 14. Accordingly, at this time, the $NO_x$ storage amount $\Sigma NOX1$ of the upstream $NO_x$ storing catalyst 12 drops, and the $NO_x$ storage amount $\Sigma NOX2$ of the downstream $NO_x$ storing catalyst 14 increases.

Figure 6:
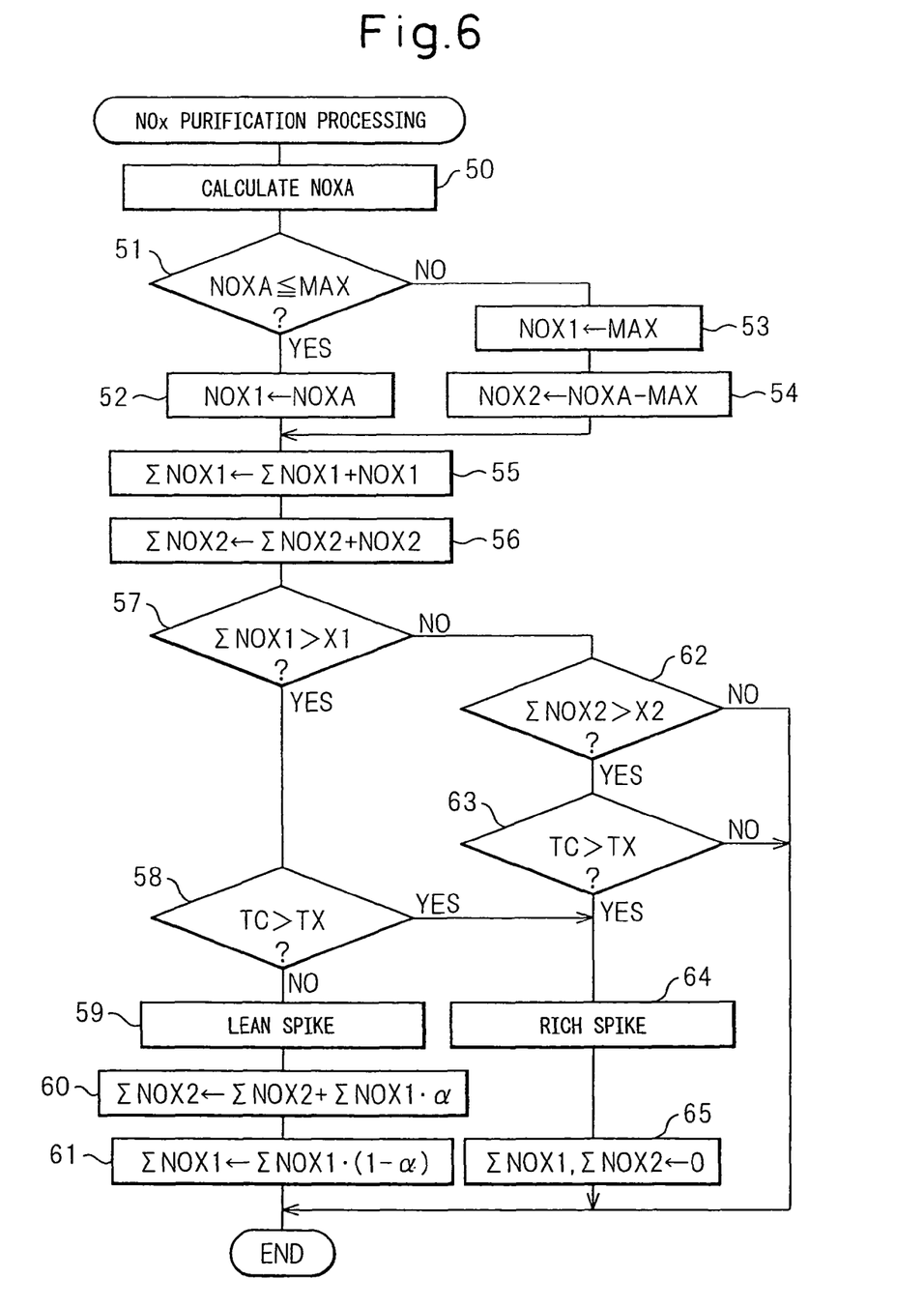
FIG. 6 is a flowchart for executing purification processing of the $NO_x$.

FIG. 6 shows the purification processing routine of the $NO_x$. This routine is executed by interruption every predetermined time period.

Referring to FIG. 6, first, at step 50, the exhausted $NO_x$ amount NOXA exhausted per unit time is calculated from the map shown in FIG. 5(A). Next, at step 51, it is judged if this exhausted $NO_x$ amount NOXA is smaller than the maximum $NO_x$ storage amount MAX. When NOXA$\leq$MAX, the routine proceeds to step 52, where the $NO_x$ amount NOX1 stored per unit time in the upstream $NO_x$ storing catalyst 12 is made the exhausted $NO_x$ amount NOXA. Next, the routine proceeds to step 55.

As opposed to this, when it is judged at step 51 that NOXA>MAX, the routine proceeds to step 53, where the $NO_x$ amount NOX1 stored per unit time in the upstream $NO_x$ storing catalyst 12 is made the maximum $NO_x$ storage amount MAX. Next, the routine proceeds to step 54, where the $NO_x$ amount NOX2 stored per unit time in the downstream $NO_x$ storing catalyst 14 is made the exhausted $NO_x$ amount NOXA minus the maximum $NO_x$ storage amount MAX (NOXA−MAX). Next, the routine proceeds to step 55. At step 55, NOX1 is added to the $NO_x$ amount $\Sigma NOX1$ stored in the upstream $NO_x$ storing catalyst 12, next at step 56, NOX2 is added to the $NO_x$ amount $\Sigma NOX2$ stored in the downstream $NO_x$ storing catalyst 14.

Next, at step 57, it is judged if the stored $NO_x$ amount $\Sigma NOX1$ of the upstream $NO_x$ storing catalyst 12 exceeds the allowable value X1. When $\Sigma NOX1$>X1, the routine proceeds to step 58, where it is judged if the representative temperature TC of the $NO_x$ storing catalysts 12 and 14 is higher than the predetermined set value TX. When TC$\leq$TX, the routine proceeds to step 59, where lean spike processing where the amount is lowered under a lean air-fuel ratio is performed. Next, at step 60, $\Sigma NOX2$ is added to $\Sigma NOX1 \cdot \alpha (0<\alpha \leq 1)$, next, at step 61, $\Sigma NOX1$ is made $\Sigma NOX1 \cdot (1-\alpha)$. As opposed to this, when it is judged at step 58 that TC>TX, the routine proceeds to step 64, where rich spike processing where the air-fuel ratio of the exhaust gas is temporarily switched from lean to rich is performed. Next, at step 65, $\Sigma NOX1$ and $\Sigma NOX2$ are cleared.

On the other hand, when it is judged at step 57 that $\Sigma NOX1 \leq X1$, the routine proceeds to step 62, where it is judged if the stored $NO_x$ amount $\Sigma NOX2$ of the downstream $NO_x$ storing catalyst 14 exceeds the allowable value X2. When $\Sigma NOX2$>X2, the routine proceeds to step 63, where it is judged if the representative temperature TC of the $NO_x$ storing catalysts 12 and 14 is higher than the predetermined set temperature TX. When TC$\leq$TX, the processing cycle is ended. As opposed to this, when TC>TX, the routine proceeds to step 64, where rich spike processing where the air-fuel ratio of the exhaust gas is switched from lean to rich is performed.

List Of Reference Numerals
4 . . . intake manifold
5 . . . exhaust manifold
7 . . . exhaust turbocharger
12 . . . upstream $NO_x$ storage catalyst
14 . . . downstream $NO_x$ storage catalyst
15 . . . reducing agent feed valve

The invention claimed is:

1. An exhaust purification device of an internal combustion engine comprising:
   a pair of $NO_x$ storing catalysts arranged in an exhaust passage,
   the pair consisting of an upstream catalyst and a downstream catalyst, the downstream catalyst being located downstream of the upstream catalyst relative to an inflow of exhaust gas to the pair,
   each of the upstream and downstream catalysts store $NO_x$ contained in the exhaust gas when the inflow of exhaust gas is a lean air-fuel ratio, and at least one catalyst releases the stored $NO_x$ when an oxygen concentration of the exhaust gas drops at least a threshold amount, and
   a controller programmed to judge necessity to move $NO_x$ stored in the upstream catalyst to the downstream catalyst, and to send a command to reduce the oxygen concentration of the exhaust gas by at least the threshold amount while keeping the lean air-fuel ratio when the controller judges the necessity,
   wherein when an $NO_x$ amount stored in the upstream catalyst exceeds an allowable amount and if a temperature representing temperatures of the pair of $NO_x$ storing catalysts is lower than a predetermined set temperature, the controller sends a command to temporarily lower the oxygen concentration in the exhaust gas by at least the threshold amount while maintaining the exhaust gas at the lean air-fuel ratio to cause the upstream $NO_x$ storing catalyst to release the $NO_x$ and store the released $NO_x$ in the downstream $NO_x$ storing catalyst, and
   when the $NO_x$ amount stored in the upstream catalyst exceeds the allowable amount and if the temperature representing the temperatures of the pair of $NO_x$ storing catalysts is higher than the predetermined set temperature, the controller sends a command to temporarily switch the air-fuel ratio of the exhaust gas from lean to rich to cause the upstream $NO_x$ storing catalyst and the downstream $NO_x$ storing catalyst to release the $NO_x$ and reduce the $NO_x$.

2. The exhaust purification device of an internal combustion engine as claimed in claim 1, wherein when an $NO_x$ amount stored in the downstream $NO_x$ storing catalyst exceeds an allowable amount and if the temperature representing the temperatures of the pair of $NO_x$ storing catalysts is greater than a predetermined set temperature, the controller sends a command to temporarily switch the air-fuel ratio of the exhaust gas from lean to rich to cause the upstream $NO_x$ storing catalyst and downstream $NO_x$ storing catalyst to release the $NO_x$ and reduce the $NO_x$.

3. The exhaust purification device of an internal combustion engine as claimed in claim 1, wherein a reducing agent feed valve for feeding a reducing agent comprised of a hydrocarbon is arranged inside the engine exhaust passage upstream of the upstream $NO_x$ storing catalyst, and the oxygen concentration of the exhaust gas is lowered by feeding the hydrocarbon from the reducing agent feed valve.

* * * * *